Jan. 20, 1959     O. A. K. ERBE ET AL     2,869,373
COARSE AND FINE MOVEMENT FOR OPTICAL
INSTRUMENTS, ESPECIALLY MICROSCOPES
Filed March 30, 1954

United States Patent Office 2,869,373
Patented Jan. 20, 1959

2,869,373

COARSE AND FINE MOVEMENT FOR OPTICAL INSTRUMENTS, ESPECIALLY MICROSCOPES

Otto August Karl Erbe, Karl Hartwig, and August Rakebrandt, Gottingen, Nether-Saxonia, Germany, assignors, by mesne assignments, to Carl Zeiss, Heidenheim on the Brenz, Wurttemberg, Germany Application March 30, 1954, Serial No. 419,676

Claims priority, application Germany April 11, 1953

5 Claims. (Cl. 74—10.52)

In the copending patent application Ser. No. 361,232 arrangements have been described whereby the coarse and fine motions of optical instruments, and especially of a microscope, both act upon a single guided element. The advantage of the design described in this patent over previously known arrangements is that it is possible to change from coarse to fine and vice versa without having to clamp one or the other motion.

In accordance with the invention, any rotational movement of the fine-motion spindle is transmitted by a ball friction gear to the coarse-motion spindle, which in turn acts upon and moves the guided element. Shake in the ball friction gear is avoided in accordance with the invention by V-shaped springs which keep the balls urged into narrow recesses in the cage.

The wide and varied uses of optical instruments, and especially of microscopes equipped with a motion transmission of this kind, render it important to make the sensitivity of changing from the fine-motion spindle to the coarse-motion spindle as positive as it can be made. In this connection, it is particularly important to have this motion indifferent to shocks parallel to the motion axis. Such a shock might cause the balls of the ball friction gear to wedge between the taper surface rigidly bordering against them and the closely fitting friction surface of the fine-motion axis, and so to cause damage to these surfaces. This means that no exact following of the balls could any longer take place in changing the direction of rotation.

By way of a further elaboration of the object of the invention of the above named patent application, the contingency just described is avoided by arranging the balls of the friction gear so that they can give way parallel to the fine-motion axis. To this end, the balls are to advantage disposed between the inside taper surface of a bearing shell and an internal-taper ring loose within the bearing shell and acted upon by a spring. In this case, the bearing shell is best accommodated within a fixed bearing box and movable endwise parallel to the fine-motion axis. By this arrangement between axially movable parts, the balls are not only able to give way in the case of shocks, but constant contact with the bordering surfaces is assured and the balls precisely follow any change in the direction of rotation of the coarse or fine-motion spindles. Additional details of the invention will be understood from the description of the attached drawing.

Figure 1:
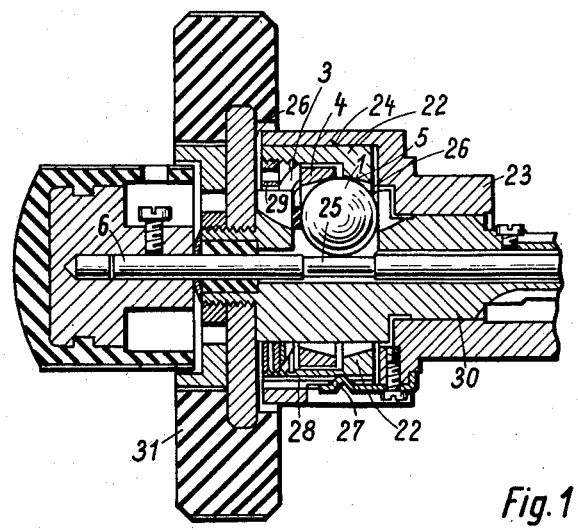
Fig. 1 is a vertical section through the motion transmission.
Figure 4:
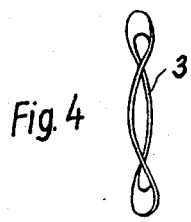
Fig. 4 is a part of Fig. 1.

In Fig. 1, a movable bearing shell 22 is so disposed within a fixed bearing box 23 as to allow 22 to slide along a boundary surface 24 parallel to the fine-motion axis, within a space limited to the two endwise clearances 26. A spring 27 attached to fixed bearing box 23, and which enters by a V-shaped tongue into a slot 28 of shell 22 parallel to fine-motion spindle 6, prevents 22 from turning. Contained within shell 22 is a loose internal-taper ring 4 with a spring 3. In addition, shell 22 has a taper surface 5 whereby it borders upon the balls 1 of the friction gear. Spring 3 passes between loose taper ring 4 and an adjusting ring 29 connected with shell 22 by a thread.

When a shock comes upon coarse-motion head 31 parallel to fine-motion spindle 6, Fig. 1, say from the left, coarse-motion spindle 30 is shifted in the direction of the shock and takes along shell 22 via taper surface 5. At the same time, spring 3 expands and presses taper ring 4 against the balls 1 again. In the case of a shock upon head 31 in the opposite direction, i. e., from the right in Fig. 1, shell 22 is taken along by way of the balls 1, taper ring 4, and spring 3. In this case, the force of spring 3 overcomes the frictional force at boundary surface 24, thereby allowing taper surface 5 to follow the balls 1. In this give-and-take play, constant contact in the ball gear between the balls and the limiting surfaces, and smooth functioning of the transmission between the coarse and fine motions are insured.

It is also in the sense of this invention to have the friction surfaces of the fine-motion spindle 6 and the balls 1 not in the form of a counterpart closely fitting the curvature of the balls 1, but to design the vicinity of the area of contact between the balls 1 and fine-motion spindle 6 in the form of a cylindrical recess 25. With this design, a smooth rolling contact of the balls 1 with fine-motion spindle 6 is maintained in spite of any displacement of the spindle by shock.

Figures 2, 3:
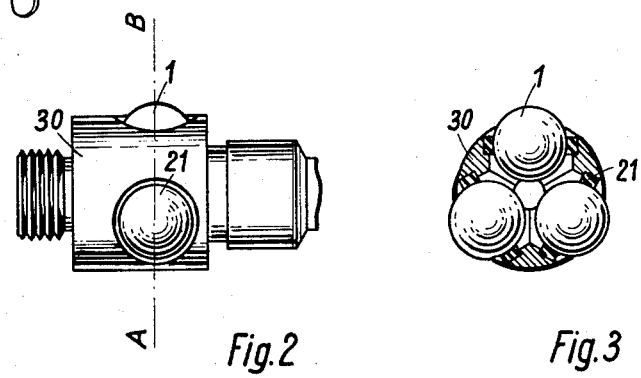
Fig. 2 is a side view of a coarse-motion spindle body serving as a ball cage.
Fig. 3 is a section along line A/B of Fig. 2.

To avoid shake in the coarse-motion spindle acting in the capacity of a ball cage, the present invention, departing from the invention underlying the above named patent application proposes lining each ball seat in the ball cage coarse-motion spindle 30, Figs. 2 and 3, with a ring 21 consisting of some elastic material with high slippage and the least possible wear, such as polyamides or polyurethan. According to the invention, the diameter of the free opening of such a ring 21 is by so much smaller than the diameter of the ball 1 accommodated in the ring, that the ball is seated in the ring without shake, yet is still able to roll without hindrance. Accordingly, it is also possible in this design of the ball cage to prevent any looseness which might disturb the sensitivity of the motion elements.

We claim:

1. In a coaxial coarse and fine movement for optical instruments with precision adjustment, especially for microscopes having a fine movement shaft and a coarse movement shaft, as well as a ball friction means, whose fine movement shaft is situated in said coarse movement shaft, and in which with said shafts said ball friction means is arranged and in which the coarse movement shaft is fashioned as a ball cage for the balls of said ball friction means, means to avoid play of the balls in said coarse movement shaft and means to avoid back lash between the coarse movement shaft and the fine movement shaft, said means to avoid back lash between the coarse movement shaft and the fine movement shaft being displaceable parallel to the fine movement shaft, stationary means to prevent said slidable means from turning.

2. In a coaxial coarse and fine movement for optical instruments with precision adjustment, especially for microscopes having a fine movement shaft and a coarse movement shaft, as well as a ball friction means, whose fine movement shaft is situated in said coarse movement shaft, and in which with said shafts said ball friction means is arranged and in which the coarse movement shaft is fashioned as a ball cage for the balls of said ball friction means, means to avoid play of the balls in said coarse movement shaft and means to avoid back lash between the coarse movement shaft and the fine movement shaft, said means to avoid back lash between the coarse movement shaft and the fine movement shaft being a member with an internal tapered border surface, a stationary bearing shell in which said member is slidable with friction and parallel to said fine movement shaft means connected to said stationary bearing shell to prevent said slidable member from turning, said tapered border surface touching said balls, and a loose taper ring within said shell touching said balls, a spring acting upon said taper ring so as to press said ring against the balls and the balls against said tapered surface and said fine movement shaft.

3. In a coaxial coarse and fine movement as in claim 2 said fine movement shaft having a cylindrical area touching said balls and allowing movements of said balls parallel to the fine movement shaft.

4. In a coaxial coarse and fine movement as in claim 1, said coarse movement shaft having holes, said balls lying in said holes, rings from elastic material of high slippage and low wear, said rings lying in said holes and said balls lying in said rings.

5. In a coaxial coarse and fine movement as in claim 2, said coarse movement shaft having holes, said balls lying in said holes, rings from elastic material of high slippage and low wear, said rings lying in said holes and said balls lying in said rings, the inner diameter of each ring being smaller than the diameter of the ball of said friction means accommodating it.

References Cited in the file of this patent

UNITED STATES PATENTS

| | | |
|---|---|---|
| 1,479,086 | Parsons | Jan. 1, 1924 |
| 2,039,622 | Bennett | May 5, 1936 |
| 2,095,279 | Newman | Oct. 12, 1937 |
| 2,192,084 | Kamenarovie | Feb. 27, 1940 |

FOREIGN PATENTS

| | | |
|---|---|---|
| 794,188 | France | Feb. 10, 1936 |
| 993,520 | France | July 25, 1951 |